April 14, 1964   C. B. JONES   3,129,162
WATER CONDITIONING SYSTEM AND METERING DEVICE THEREFOR
Filed March 6, 1962   5 Sheets-Sheet 1
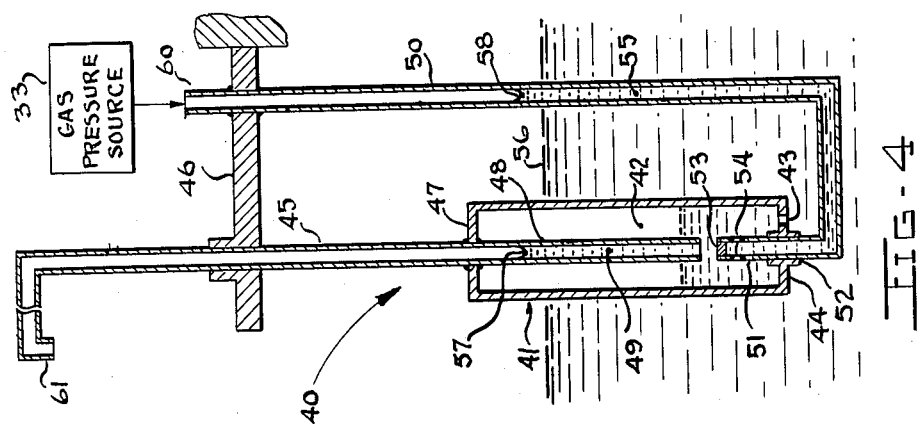
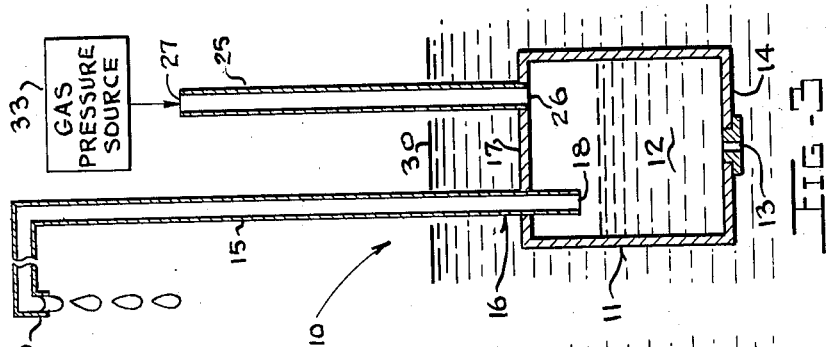
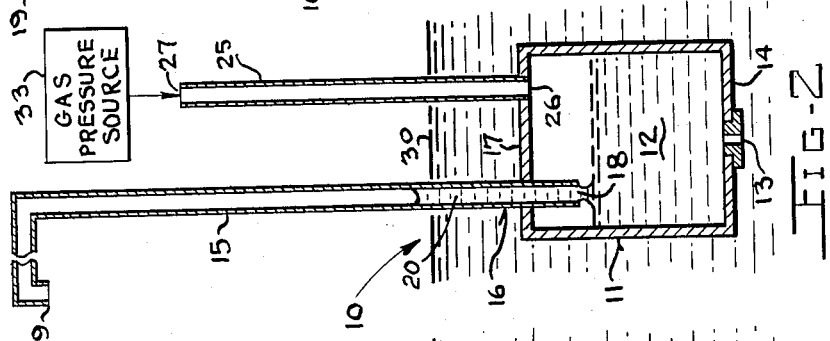
INVENTOR.
CLYDE B. JONES,
BY Leslie K. Loeh,
HIS AGENT April 14, 1964     C. B. JONES     3,129,162
WATER CONDITIONING SYSTEM AND METERING DEVICE THEREFOR
Filed March 6, 1962     5 Sheets-Sheet 2
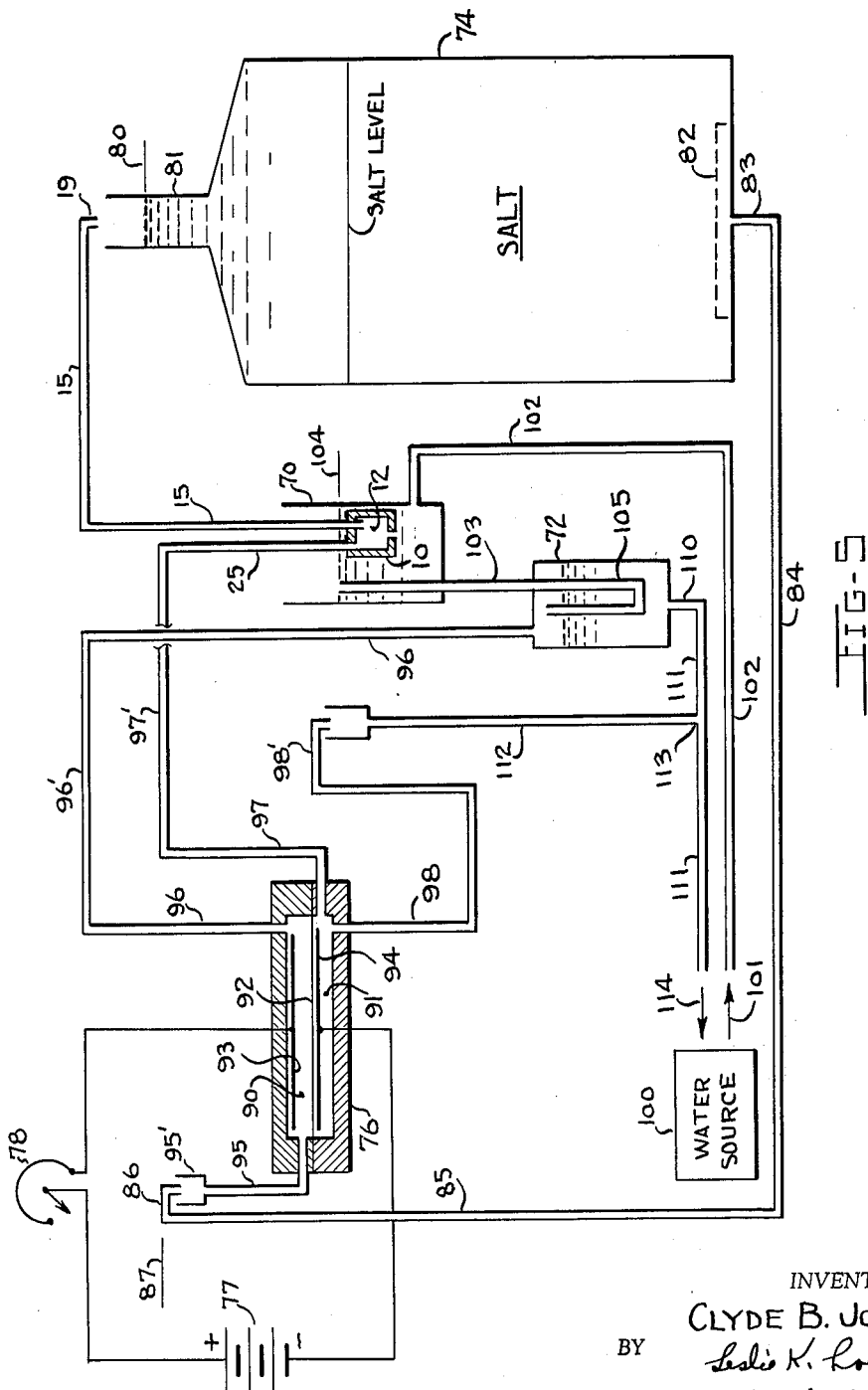
INVENTOR.
CLYDE B. JONES,
BY Leslie K. Roehr,
HIS AGENT.

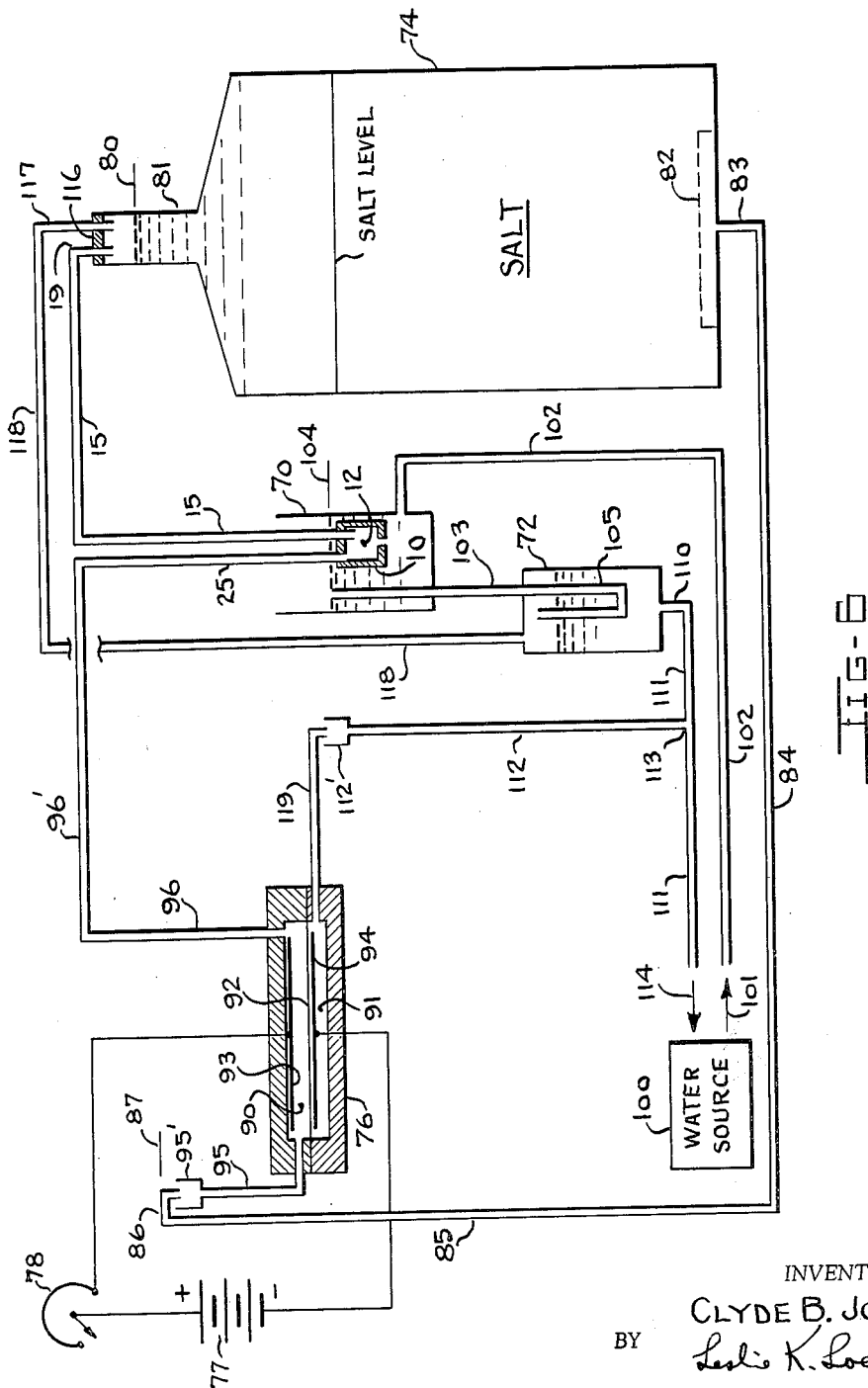

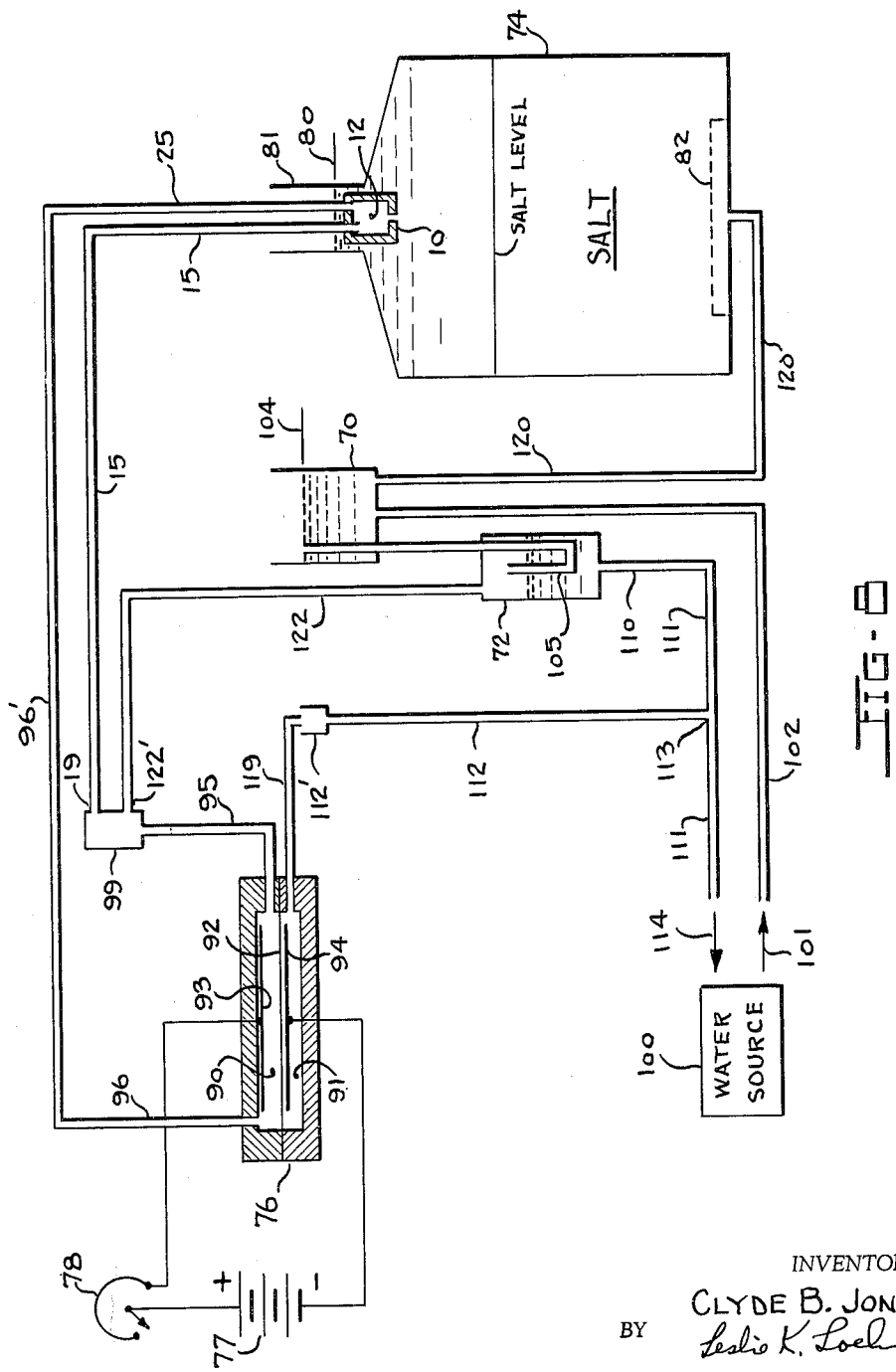

United States Patent Office 3,129,162
Patented Apr. 14, 1964

3,129,162
WATER CONDITIONING SYSTEM AND
METERING DEVICE THEREFOR
Clyde B. Jones, Los Angeles, Calif.
(3531 Alginet Drive, Encino, Calif.)
Filed Mar. 6, 1962, Ser. No. 177,796
10 Claims. (Cl. 204—278)

This invention relates to water conditioning systems suitable for use in purifying or sterilizing swimming-pool water, wherein appropriate quantities of a bactericidal solution are added to the water, and more particularly to such systems employing electrolytic cells in a process for making the bactericidal solution.

In general, systems of the above character commonly employ some type of a salt-containing tank to provide an electrolyzable liquid or brine, an electrolytic cell having anode and cathode compartments for electrolyzing the brine, and an absorption tank or some other device wherein water and at least one of the products produced by the electrolytic cell are combined to form the bactericidal solution.

In the operation of such systems, water from a water source, such as swimming-pool water is conducted through valved connections to the salt-containing tank where it forms an electrolyzable liquid which, in turn, is conducted through other valved connections into the electrolytic cell where it is electrolyzed when direct current is applied to the anode and cathode of the cell. During the electrolyzing process of the brine (when the salt used in the salt-containing tank is sodium chloride) chlorine gas, hydrogen gas, and a sodium hydroxide solution are produced in the cell. The chlorine gas is conducted to an absorption tank or chamber where it mixes with water (usually taken from the swimming pool) to form the bactericidal solution which is returned to the pool. In most installations, a portion of the sodium hydroxide is periodically admitted to the pool for the purpose of controlling the pH of the pool water.

The present invention is primarily concerned with certain improvements which relate not only to the construction of water-conditioning systems as above described, but also to methods of operating such systems. This invention contemplates an improved combination whereby the rate at which electrolyzable liquid flows from the brine-producing tank into the electrolytic cell is automatically controlled by at least one of the gases produced in the cell during the electrolyzing process. The invention further contemplates a metering device directly responsive to gas pressure for effecting the controlled flow of the electrolyzable liquid such that the rate at which said liquid enters the electrolytic cell is proportional to the rate at which at least one of the gases is produced in said cell.

Accordingly, it is a general object of the present invention to provide an improvement for water-conditioning systems of the type employing an electrolyzable liquid and an electrolytic cell in a process for making a bactericidal solution, whereby said solution is added to a body of water automatically at a preselected rate without surveillance in response to operation of the electrolytic cell.

It is another object to provide an improvement for a system of the above character employing a salt-containing receptacle arranged to receive water from a water source for producing the electrolyzable liquid, in which the electrolytic cell is arranged to receive the electrolyzable liquid from the salt-containing receptacle in response to gas produced in the cell.

In a system of the above character, it is also an object of the invention to provide improved combination for controlling the flow rate of the electrolyzable liquid entering the electrolytic cell such that the rate at which the liquid enters the cell is made proportional to the rate at which at least one of the gases is produced in the electrolytic cell during the electrolyzing process.

It is an additional object of the invention to provide a metering device operatively associated with the electrolytic cell for periodically transferring a predetermined volume of liquid from one place to another such that the amount of liquid fed to the cell is controlled by at least one gas produced in said cell.

It is also an object to provide such a metering device in which the transferring action is effected by pressurized gas produced in the electrolytic cell and applied directly to the liquid involved in the transfer.

It is another object to provide such a metering device wherein the predetermined volume of liquid is automatically separated from a supply of such liquid by pressurized gas produced in the electrolytic cell.

It is a further object of the invention to provide an improvement for swimming pool water-conditioning systems, which improvement employs the combination of an electrolytic cell and a metering device operatively associated such that electrolyzable liquid is periodically supplied to the cell from a body of liquid by the metering device in response to pressurized gas produced in said cell during the electrolyzing process.

These and other objects and advantages of the invention will become more apparent from the following description considered in connection with the accompanying drawings; it being expressly understood, however, that the drawings are for the purpose of illustration and description only, and are not intended as a definition of the limits of the invention.

In the drawings:

FIG. 1 is a schematic illustration showing a gas-operated metering device according to this invention;

FIGS. 2 and 3, similar to FIG. 1, show operating characteristics of the metering device;

FIG. 4 is a schematic illustration showing a modification of the metering device shown in FIG. 1;

FIG. 5 is a schematic illustration showing a water-conditioning system embodying the gas-operated metering device of FIG. 1;

FIG. 6 is a schematic illustration showing a modification of the water-conditioning system shown in FIG. 5;

FIG. 8 is a schematic illustration showing a third modification of the water-conditioning system shown in FIG. 5.

Figure 7:
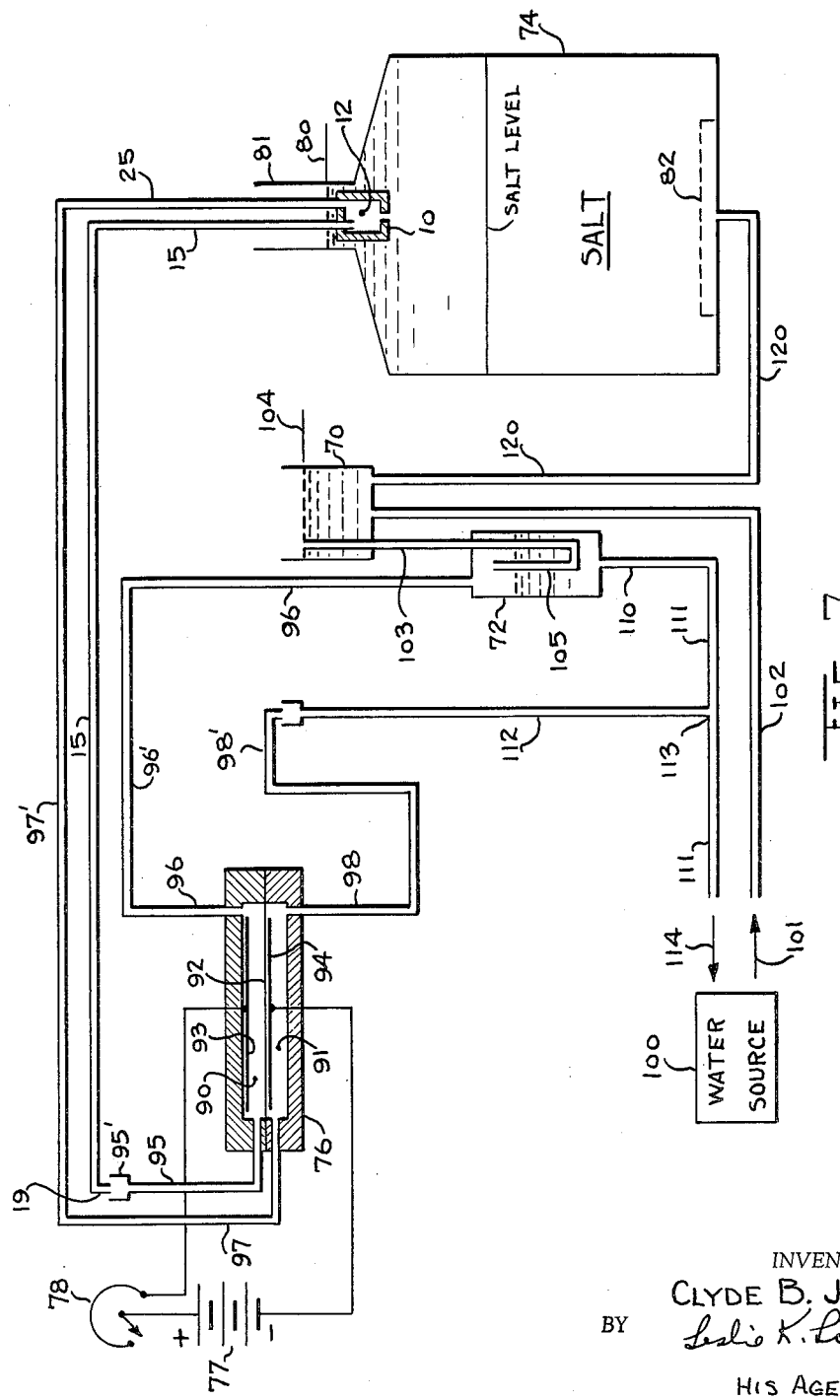
FIG. 7 is a schematic illustration showing a second modification of the water-conditioning system shown in FIG. 5.

The metering device identified generally by reference numeral 10 in FIGS. 1, 2 and 3 comprises a housing 11 having a chamber 12 and a fixed opening 13 in the bottom chamber wall 14, which opening communicates with the chamber so that submergence of the housing 11 in a body of liquid causes liquid to flow through opening 13 and to enter the chamber under hydrostatic pressure of a magnitude according to the submerged depth of the housing. An open-ended capillary tube 15 is connected to housing 11 such that proximal end portion 16 of the tube extends through the upper chamber wall 17 and downwardly into chamber 12 so that tube end opening 18 is submerged in the liquid within the chamber as shown in FIG. 1. A conduit 25 is also connected to housing 11 so as to provide an inlet opening 26 whereby pressurized gas from a suitable source entering the open distal end portion 27 of conduit 25 can be admitted to chamber 12.

As clearly illustrated in FIG. 1, when housing 11 is submerged in a body of liquid, chamber 12 is filled with this liquid through opening 13 in the bottom wall of the housing chamber. The filling of chamber 12 with liquid causes a column 20 of the liquid to rise in proximal end portion 16 of capillary tube 15 to a height slightly above surface 30 of the body of liquid as indicated by the concave meniscus 21 at the top of the column because of the liquid pressure or presure head resulting from the submergence of housing 11 in the body of liquid. Thus, it is apparent that when housing 11 is immersed or completely submerged in a body of liquid, the volume of the liquid comprising column 20 is actually determined by the depth to which end opening 18 of tube 15 extends downwardly from surface 30 into said body of liquid.

According to the showing in FIG. 2; when pressurized gas from a source 33 connected to distal end portion 27 of conduit 25 is conducted through said conduit into chamber 12, the following events occur when the pressure of the gas exceeds the magnitude of the pressure head: First, the column 34 of liquid from chamber 12, which had risen in conduit 25 through opening 26 when housing 11 was submerged (see FIG. 1), returns to the chamber; and second, gas pressure enters chamber 12 through said opening 26 and causes pressure in the chamber to increase to the extent that liquid is forced from chamber 12 through opening 13 into the main body of liquid. This displacement of chamber liquid into the body of liquid continues until the chamber liquid level is lowered such that the end of the tube and column 20 are not only separated from the liquid in the chamber, but opening 18 in the proximal end portion 16 and the lower end of said liquid column are exposed to pressurized gas in chamber 12. At this instant, the chamber gas pressure operates to force the column of liquid 20 upwardly through capillary tube 15 such as to cause the liquid to flow outwardly of distal end 19 of the tube, as shown in FIG. 3, where the liquid comprising the column falls by gravity into any suitable container not shown, but which may be disposed at a distant location relative to the main body of liquid.

At this point in the description of metering device 10, it should be noted that the characteristics of capillary tube 15 are such that the liquid comprising column 20 remains in concave meniscus-forming contact with the inner surface of the tube wall and such that the column of liquid precludes the escape of the pressurized gas from the time the column enters the proximal end portion 16 until it is expelled from the tube at the distal end portion 19. Stated differently, tube 15 is of a character such that liquid column 20 is not only movable by gas pressure in chamber 12, but it is also effective as means closing or blocking the tube with respect to said gas pressure until said column has moved through the tube such that the liquid comprising the column flows from the distal end portion of the tube.

It is also to be noted that end portion 19 of the capillary tube is oriented with respect to proximal end portion 16 and housing 11 such that the distal end is above the proximal end opening 18 so as to preclude removal of any liquid from chamber 12 by means of gravity and/or siphon actions.

After expulsion of column 20 from capillary tube 15, this tube is open and pressurized gas in chamber 12 exhausts to ambient atmosphere through said tube; hence, gas pressure in the chamber drops to a value substantially equal to atmospheric pressure whereupon liquid under liquid pressure from the main body of liquid flows through opening 13 into chamber 12 such that another column of liquid rises in the proximal end portion 16 thereby to effect the beginning of another cycle starting with a condition such as shown in FIG. 1, then changing to a condition illustrated in FIG. 2, and ending with a condition according to FIG. 3.

Fixed opening 13 in the bottom chamber wall 14 is preferably restricted, which is to say that the size of this opening is relatively small so as to restrict the rate at which liquid flows into and out of chamber 12. Thus, when chamber 12 is filled with liquid according to the showing in FIG. 1, and pressurized gas is admitted to the chamber, adequate time is assured for the forming of an intact liquid column of desired volume in the proximal end portion of the capillary tube before the liquid level is lowered such that the tube-end opening 18 is exposed to the gas in said chamber. Moreover, once the column of liquid has been expelled from the capillary tube, the restricted return flow of liquid into chamber 12 through the relatively small opening 13 also assures adequate time for the gas in said chamber to be exhausted through the capillary tube before end opening 18 is again blocked by the liquid entering the chamber.

A unique feature of the above-described metering device resides in the fact that, because of opening 13 in bottom wall 14 of housing 11, liquid column 20 in end portion 16 of tube 15 is not only connected with the main body of liquid but it constitutes a part of that body until it is separated therefrom when the level of the liquid in chamber 12 is lowered to the extent that opening 18 and the bottom of column 20 are exposed to the pressurized gas in the chamber. Hence, it should be evident that, even during displacement of chamber liquid by pressurized gas, the pressure head of the main body of liquid not only determines the height of the column of liquid in the capillary tube, but it also determines the pressure magnitude of the perssurized gas required for forcing chamber liquid back to the main body of liquid through opening 13.

From the foregoing description of metering device 10, it is now apparent that a predetermined quantity of pressurized gas entering liquid-filled chamber 12 will operate to expel a predetermined quantity of the liquid in one end of a capillary tube; that the quantity of liquid expelled from the capillary tube is proportional to the pressure head of the liquid filling said capillary tube; and that the predetermined quantity of liquid expelled from the capillary tube is taken from a body of liquid at a rate proportional to the rate at which pressurized gas is admitted to chamber 12. Therefore, metering device 10 operates to not only meter a predetermined quantity of liquid, but it also transfers the metered quantity periodically from one place to another. Moreover, it is so designed that it can be constructed for performing these operation on relatively small quantities of liquid in response to small quantities of low-pressure gas.

A modification of metering device 10, shown in FIG. 4 and identified generally by reference numeral 40, comprises a housing 41 having a chamber 42 and an opening 43 in the bottom chamber wall 44, which opening communicates with the chamber so that immersion of the housing in a body of liquid causes liquid to enter said chamber under liquid pressure from the body of liquid. An open-ended capillary tube 45, slidably supported for up-and-down vertical movement by a suitable stationary bracket 46, is rigidly connected to the upper chamber wall 47 of housing 41 such that proximal end portion 48 of tube 45 extends through said wall downwardly within chamber 42 toward bottom wall 44 and such that up-and-down vertical movement of the housing causes similar movement of the capillary tube.

A conduit 50 fixedly supported by bracket 46 so as to extend downwardly along one side of housing 41 is provided with an upturned end portion 51 which is slidably received by a suitable opening 52 in bottom wall 44 such that end portion 51 extends upwardly within chamber 42 toward end portion 48 of tube 45, and such that housing 41 is vertically movable with respect to end portion 51 of conduit 50.

Looking closely at end portion 51 it can be seen that the axial opening is closed by a plug 53, and that communication between chamber 42 and the bore of conduit 50 is provided by holes 54 drilled through the side walls of the conduit.

When the housing 41 is immersed in a body of liquid according to the showing in FIG. 4, liquid flows in response to the pressure head of said body of liquid into chamber 42 through opening 43 until the level of the liquid in the chamber is such that the pressure of the gas trapped in said chamber above the liquid is of a magnitude sufficient to support the weight of housing 41 plus the weight of any attachments which may be carried by the housing. For purposes of description, it is assumed that in FIG. 4, the level of the liquid is such that the pressure of the gas trapped in chamber 42 is of a magnitude sufficient to support housing 41 and capillary tube 45 in the positions shown. Thus, a condition of equilibrium exists between the trapped gas and the liquid in chamber 42. Under this condition, end portion 51 within the chamber is submerged in chamber liquid and the capillary tube end portion 48 is also submerged to a preselected depth in said chamber liquid as clearly shown in FIG. 4. Submergence of end portions 48 and 51 causes columns of liquid 49 and 55 to rise in capillary tube 45 and conduit 50 in response to the pressure head of the body of liquid to a level slightly above the surface 56 of the body of liquid as indicated by meniscus 57 on top of column 49 and meniscus 58 on top of column 55.

When pressurized gas from a source 33 connected to end portion 60 is conducted through conduit 50 into chamber 42, the following events occur: First, the column of liquid 55 in conduit 50 returns to chamber 42 through holes 54 in end portion 51 and to the main body of liquid through opening 43; and second, pressurized gas enters chamber 42 through said holes 54 and causes an increase in the volume of gas in the upper portion of the chamber which, in turn, increases the pressure magnitude of the trapped gas to the extent that (a) liquid from chamber 42 is forced outwardly through opening 43 into the body of liquid, and (b) housing 41 is elevated so that the state of equilibrium causes changed conditions wherein the relationship between the end of portion 48 and the liquid in chamber 42 is similar to the relationship between end portion 16 of capillary tube 15 and the liquid in chamber 12, as illustrated in FIGS. 2 and 3. In other words, since the pressure magnitude required of the gas pressure in chamber 42 to support housing 41 (and any attachments carried thereby) remains constant, the addition of pressurized gas to the chamber causes liquid to flow outwardly from said chamber into the main body of liquid through opening 43 such that a lowering of the chamber liquid level is effected and the state of equilibrium is maintained.

When the liquid column in end portion 48 of the capillary tube is separated from the liquid in chamber 42 according to the showing in FIG. 3, column 49 is exposed to the pressurized gas in said chamber, which gas operates to expel the column of liquid out the open distal end portion 61 of capillary tube 45.

After liquid column 49 has been expelled from the capillary tube, this tube is open and pressurized gas in chamber 42 exhausts to ambient atmosphere; hence, the pressure magnitude of the gas in the chamber decreases which, in turn, causes a lowering of housing 41 in the main body of liquid and the return of liquid to chamber 42 through opening 43 such that the conditions of equilibrium shown in FIG. 4 are reestablished and the beginning of another cycle is effected.

The structural and functional characteristics of capillary tube 45 and opening 43 in bottom wall 44 are the same as the structural and functional characteristics of capillary tube 15 and opening 13 previously described in connection with FIGS. 1, 2 and 3. It should also be noted that the open ends of capillary tubes 45 and 15 in chambers 42 and 12 are positioned above fixed openings 43 and 13. Thus, when the liquids in the chambers have been forced outwardly thereof through fixed openings 43 and 13 by pressurized gas such that the open ends of the tubes and the columns of liquid are separated from the chamber liquids, these fixed openings are effectively closed to the pressurized gas by the liquids remaining in the chambers. Hence, the effectiveness of the pressurized gas for moving the columns of liquid out of the capillary tubes is assured.

An important feature of the combination contemplated by the present invention resides in the adaptability of this combination for use in water-conditioning systems of the type employing an electrolytic cell in a process for producing a bactericidal agent such as a chlorine solution which is periodically added in small quantities to a body of water such as the water in a swimming pool. For an explanation of this adaptability reference is now made to the several water-conditioning systems schematically illustrated in FIGS. 5 through 8. These systems are similar to each other in that each system employs a transfer tank 70, an absorption tank 72 for producing the bactericidal agent, a brine tank 74 containing (as an example) salt crystals of sodium chloride for making an electrolyzable liquid, an electrolytic cell 76 for producing at least one ingredient of the bactericidal agent, and a suitable source of direct current such as battery 77 connected to cell 76 by an electrical circuit embracing a rheostat 78 for controlling direct current amperage flowing through said cell. Moreover, to fully understand the importance and utility of the invention, attention is directed to the fact that in each system, metering device 10 and electrolytic cell 76 are combined in cooperative relationship such that pressurized gas produced in the cell operates to feed the cell with the electrolyzable liquid which is essential to its gas-producing function.

In preparing the system of FIG. 5 for operation, brine tank 74 is first filled with water to a level identified by line 80 adjacent neck-like portion 81 formed on top of the tank. Water admitted to tank 74 combines with salt in the tank and produces an electrolyzable liquid commonly referred to as a brine or an electrolyte which is filtered by suitable means 82 at the bottom of the tank such that liquid flowing from said tank through outlet 83 is free of salt crystals and other foreign matter. From outlet 83, the liquid flows through a conduit 84 into a standpipe 85 having an end portion 86 located at a level identified by line 87, which level may be slightly lower than the level of the water in the brine tank indicated by line 80. In this connection, it should be noted that neck-like portion 81 of tank 74 is characterized by a relatively small cross-sectional area such that the addition of a small quantity of water, even a few drops, will produce a head in the tank sufficient to cause the same quantity of liquid to flow from end-portion 86 of standpipe 85.

Electrolytic cell 76 of conventional construction, having anode and cathode compartments 90 and 91 which are separated by a diaphragm 92 and are respectively provided with anode and cathode electrodes 93 and 94, is arranged to receive electrolyzable liquid from brine tank 74 by means of a vertically rising inlet duct 95 connected to the anode compartment 91. As shown in the drawing, duct 95 includes an enlarged distal end portion 95' positioned so as to receive any liquid flowing by gravity from end portion 86 of standpipe 85. Thus, in the filling of tank 74, sufficient water is added to the tank such that an adequate quantity of the electrolyzable liquid is produced in said tank for initially filling electrolytic cell 76.

Since the salt contained in tank 74 is sodium chloride (previously given as an example), the electrolyzable liquid filling cell 76 is a sodium chloride solution; hence, passage of direct current from battery 77 between anode 92 and cathode 93 causes chlorine gas to be produced in anode compartment 90 and the production of hydrogen gas and a solution of sodium hydroxide in cathode compartment 91. According to the drawing, the chlorine gas is conducted by a conduit 96 from anode compartment 90 to absorption tank 72, and the hydrogen gas is conveyed by a conduit 97 to inlet conduit 25 of metering device 10 positioned in tank 70 according to requirements set forth above in the description of FIGS. 1, 2 and 3. Conduits 96 and 97 are respectively provided with portions 96′ and 97′ arranged at heights above cell 76 such as to preclude any drainage of liquid from the cell by siphon or gravity actions during normal operation of the system. Drainage of the sodium hydroxide solution produced in cathode compartment 91 is effected by a conduit 98 having one end communicating with said compartment and the other or distal end 98′ arranged at a level such that a satisfactory head is provided for draining the hydroxide solution from compartment 91 at a rate substantially equal to the production rate of said solution.

Transfer tank 70 arranged to receive water from a source 100, is connected to absorption tank 72 by a conduit 103 rising vertically from the top wall of tank 72 and extending upwardly through the bottom wall of the transfer tank to a height in tank 70 such that any liquid above a level indicated by line 104 will flow by gravity into tank 72 through conduit 103 and a trap 105 which trap is provided to preclude the escape of chlorine gas from the absorption tank to ambient atmosphere through conduit 103.

A small stream of water indicated by arrow 101 is caused to flow from source 100 (representative of a swimming pool) through a conduit 102 at a rate sufficient to maintain water in the transfer tank at the level indicated by line 104 and at the same time provide the water essential to the function of the absorption tank 72.

When tanks 70, 72 and 74 are filled with water and electrolytic cell 76 is filled with the sodium chloride solution as above described, operation of the system in FIG. 5 is started by manipulation of rheostat 78 so as to initiate electrolytic decomposition of the solution in cell 76 by the direct current flowing from battery 77 between anode 92 and cathode 93 of the cell. Once the electrolyzing process is established, chlorine gas flows from anode compartment 90 into absorption tank 72, sodium hydroxide solution flows outwardly of cathode compartment 91 through conduit 98, and hydrogen gas flows from the cathode compartment into metering device 10 positioned in transfer tank 70.

In absorption tank 72, the chlorine gas combines with water in the tank to form a chlorine solution which flows from tank 72 through an outlet 110 into a conduit 111; while the sodium hydroxide solution flowing from distal end 98′ of conduit 98 into a standpipe 112 joins the chlorine solution in conduit 111 at junction 113 such that a mixture of the chlorine and hydroxide solutions flows from conduit 111 as indicated by arrow 114 into water source 100.

The hydrogen gas produced in cathode compartment 91 flows through conduit 97 and conduit 97′ into conduit 25 which conducts the hydrogen into chamber 12 of metering device 10 (see FIGS. 1, 2 and 3) where it operates to provide a metered flow of water from transfer tank 70 into brine tank 74 such that water in neck-like portion 81 is maintained at a level sufficient to provide the head required for a similar metered flow of liquid to the electrolytic cell.

Stated differently, production of the gases and the sodium hydroxide solution not only depletes the electrolyzable liquid in cell 76, but the rates of production of these products taken singly or in combination are accurate indications of the rate of liquid depletion, and any one of these production rates may be used as a measure for adding new liquid to the cell. Hence, it should now be apparent that the addition of electrolyzable liquid to cell 76 at a rate proportional to the production rate of at least one of the gases will provide the cell with adequate liquid for continuous operation of the electrolyzing process. It is also pointed out that the rate of liquid depletion in cell 76 is proportional to the direct current amperage flowing between anode 92 and cathode 93; consequently, the rate of depletion and the production of chlorine gas, hydrogen gas, and sodium hydroxide are controllable through manipulation of rheostat 78.

From the foregoing description of FIG. 5, it should be evident that metering device 10 in the transfer tank operates to transfer water from tank 70 to brine tank 74 via capillary tube 15 and distal end portion 19 which, in turn, causes a like amount of the electrolyzable liquid to be transferred from the brine tank into electrolytic cell 76, all in response and proportion to hydrogen gas produced in said cell.

FIG. 6 illustrates a water-conditioning system similar to the system in FIG. 5 except that chlorine gas produced in the electrolytic cell is employed to actuate metering device 10. In the system of FIG. 6, brine tank 74 is first filled with water to the level indicated by line 80 adjacent neck-like portion 81 by any conventional means (not shown). A small stream of water indicated by arrow 101, is caused to flow from source 100 through conduit 102 into transfer tank 70 at a rate adequate to provide the water essential to the function of absorption tank 72, and to provide tank 70 with sufficient water to maintain the water level in this tank as indicated by line 104. Electrolytic cell 76 is filled by gravity flow from brine tank 74 in the manner described for the system in FIG. 5.

When electrolytic cell 76 and tanks 70, 72 and 74 are filled, and direct current is caused to flow from battery 77 by manipulation of rheostat 78, the intended functioning of the system in FIG. 6 is established. In other words, chlorine gas is produced in anode compartment 90, and sodium hydroxide and hydrogen gas are produced in cathode compartment 91. However, in this system the chlorine gas is conducted through conduit 96—96′ and conduit 25′ into chamber 12 of metering device 10 (see FIGS. 1, 2 and 3) where it operates to provide a metered flow of water from transfer tank 70 into brine tank 74 through capillary tube 15 and its distal end portion 19 in the manner previously described. It should be noted that neck-portion 81 of tank 74 is provided with a plug-like element 116 which closes the top of the tank, and that distal end portion 19 of capillary tube 15 extends through element 116 such that water and chlorine gas are delivered to the interior of the tank; the water being added to the liquid in said tank for maintaining the liquid level indicated by line 80 and the gas being permitted to escape through an outlet 117 projecting outwardly of neck-like portion 81 through element 116. As shown, outlet 117 constitutes one end of a conduit 118 having its other end connected to absorption tank 72 such that the chlorine gas admitted to the brine tank (via capillary tube 15) is conducted to the absorption tank so as to form the chlorine solution flowing into conduit 111.

The hydrogen gas and sodium hydroxide solution produced in cathode compartment 91 are conducted through a conduit 119 to enlarged end-portion 112′ of standpipe 112 such that the hydrogen gas exhausts to ambient atmosphere and the sodium hydroxide flows into conduit 111 where it joins the chlorine solution at junction 113 to constitute a water-treating solution flowing into water source 100 as indicated by arrow 114.

From the above description of FIG. 6, it is clearly evident that a water-conditioning system is provided in which water is delivered into a brine-producing tank and brine from this tank is admitted into an electrolytic cell in response and at rates proportional to the rate at which chlorine gas is produced in said cell.

In FIG. 7 there is shown a water-conditioning system which is similar to the systems of FIGS. 5 and 6 except that in FIG. 7 transfer tank 70 is directly connected to the bottom of brine tank 74 by a conduit 120, and metering device 10 is positioned in neck-like portion 81 of tank 74. Another difference resides in the fact that in the system of FIG. 7 electrolytic cell 76 is not coupled by gravity-flow to tank 74; hence, the filling of cell 76 with the electrolyzable liquid is initially effected in a suitable manner such as by pouring some of the liquid into enlarged distal end 95' of the duct 95 connected to anode compartment 90 of the cell. A small stream of water indicated by arrow 101, is caused to flow from source 100 through conduit 102 into transfer tank 70 at a rate sufficient to (a) provide the water essential to the function of absorption tank 72, (b) provide brine tank 74 with the water required to maintain brine in neck-like portion 81 of the brine tank at the level indicated by line 80, and (c) provide tank 70 with sufficient water to maintain the water level in this tank as indicated by line 104.

When electrolytic cell 76 and tanks 70, 72 and 74 are filled, and the cell is activated by direct current from battery 77, operation of the system in FIG. 7 is similar to the operation of the system in FIG. 5. In other words, chlorine gas flows from anode compartment 90 through conduit 96—96' into absorption tank 72; sodium hydroxide flows from cathode compartment 91 through conduit 98—98' into standpipe 112; and hydrogen gas flows from the cathode compartment through conduits 97—97' and conduit 25 into chamber 12 of metering device 10 where it operates as set forth in the description of FIGS. 1, 2 and 3. However, in this system, electrolyzable liquid is transferred directly from brine tank 74 to electrolytic cell 76 by the metering device via capillary tube 15, a condition clearly shown in the drawing.

As in FIGS. 5 and 6, the chlorine solution formed in absorption tank 72 flows through outlet 110 into conduit 111 where it combines with sodium hydroxide from conduit 112 at junction 113 to form a mixed solution flowing into water source 100 as indicated by arrow 114.

It is evident from the above description that the system shown in FIG. 7 operates to transfer electrolyzable liquid directly from brine tank 74 into electrolytic cell 76 in response and at a rate proportional to the rate at which hydrogen gas is produced in the electrolytic cell.

Looking at FIG. 8, it is noted that the water-conditioning system shown therein is arranged in a manner similar to the arrangement of the system in FIG. 7. However, in FIG. 8, chlorine gas produced in the electrolytic cell is employed to transfer the electrolyzable liquid directly from the brine tank into said cell.

A small stream of water indicated by arrow 101, is caused to flow from source 100 through conduit 102 into transfer tank 70 at a rate such as to (a) provide the water essential to the proper functioning of absorption tank 72, (b) provide the water required to maintain the water level in neck-like portion 81 of brine tank 74 as indicated by line 80, and (c) provide tank 70 with sufficient water to maintain the water level at the height indicated by line 104. Attention is directed to the fact that in FIGS. 7 and 8, transfer tank 70 is elevated with respect to brine tank 74 such that the level of the water in the transfer tank indicated by line 104 is above the brine level indicated by line 80 adjacent neck-like portion 81 of the brine tank. Thus water from tank 70 flows by gravity through conduit 120 into the bottom of brine tank 74.

When electrolytic cell 76 and tanks 70, 72 and 74 are filled with their respective liquids and direct current is caused to flow between anode 93 and cathode 94 by manipulation of rheostat 78, chlorine gas flows from anode compartment 90 through conduit 96—96' and conduit 25 into chamber 12 of metering device 10 positioned in neck-like portion 81 of tank 74 where it operates (as in FIG. 7) to transfer brine directly into the electrolytic cell. However, in FIG. 8, end portion 19 of the capillary tube 15 communicates with a closed chamber 99 connected to the upper end of conduit 95 such that brine expelled from the capillary tube flows by gravity into the anode chamber of the electrolytic cell. The chlorine gas entering chamber 99, is conducted to absorption tank 72 by a conduit 122 which is arranged such that an end portion 122' communicates with said chamber in the manner shown. In the absorption tank, the chlorine combines with water to form a chlorine solution flowing through outlet 110 into conduit 111.

The sodium hydroxide solution and the hydrogen gas produced in cathode compartment 91 are conveyed through a conduit 119 to the enlarged end-portion 112' of standpipe 112 such that the hydrogen gas escapes to ambient atmosphere and the sodium hydroxide flows through standpipe 112 into conduit 111 where it joins the chlorine solution at junction 113 to produce a water-treating solution flowing into water source 100 as indicated by arrow 114.

It should now be apparent that the system in FIG. 8 operates such that brine is transferred directly from the brine tank into the electrolytic cell at a rate proportional to the rate at which chlorine gas is produced in said cell, and such that the actual transfer of the brine is effected by the gas so produced.

What is claimed as new is:

1. The combination of
    a first source of liquid electrolyte;
    a second source of liquid water for supplying water to said first source;
    an electrolytic cell associated with the first source for producing gas from the liquid electrolyte; and
    means for causing electrolyte from the first source to be supplied to said electrolytic cell in response and proportion to gas produced in said cell, said means comprising
    a housing defining a chamber having a fixed opening;
    an open-ended capillary tube connected to the housing such that a portion of the tube extends downwardly within the housing chamber and such that one open end of the tube is positioned above the fixed opening in said chamber;
    said housing being associated with one of the first and second sources of liquid such that one source is fluid-conductively connected to the housing chamber for conducting liquid through the fixed chamber opening from said one source of liquid into said chamber and from the chamber to said one source, and such that said housing is arranged with respect to said one source so that liquid from said one source is caused to flow through the fixed chamber opening into said housing chamber and upwardly in the downwardly extending portion of the capilliary tube so as to form a column of said liquid in said tube having a preselected height; and
    a gas conducting conduit connecting the electrolytic cell and the housing so that gas produced in said cell is caused to enter the housing chamber for causing liquid in the chamber to flow outwardly thereof through the fixed chamber opening to said one source of liquid until the level of the chamber liquid is such that said chamber liquid is separated from the one open end of the capillary tube in said housing chamber and from the bottom of the column of liquid in said tube so that said gas is applied to said column of liquid for causing the same to be expelled from the other open end of the capillary tube; said housing, the source of electrolyte and the electrolytic cell being arranged with respect to each other and the capillary tube such that liquid expelled from the other open end of said tube results in electrolyte from said source being added to said cell.

2. The combination defined in claim 1 in which the capillary tube is of a character such that the liquid comprising the column of liquid remains in concave meniscus-forming contact with the inner surface of the tube until the column of liquid is expelled from the other open end of said capillary tube.

3. The combination defined in claim 2 in which the first and second sources of liquid respectively comprise a first body of liquid electrolyte and a second body of liquid water; and in which the housing is associated with one of said first and second bodies of liquid such that said housing is arranged with respect to said one body of liquid so that the height of the liquid in said one body causes said liquid to flow through the fixed chamber opening into the chamber of said housing and upwardly in the downwardly extending portion of the capillary tube to form a column of said liquid in said tube such that the height of the top of said column is substantially equal to the height of the top of the liquid in said one body of liquid.

4. The combination defined in claim 3, in which the housing is associated with the first body of liquid electrolyte such that said first body is fluid-conductively connected to the housing chamber for conducting electrolyte through the fixed chamber opening from the body of the electrolyte into said chamber to said body of electrolyte; and in which said housing, said body of electrolyte and the electrolytic cell are arranged with respect to each other and the capillary tube such that electrolyte expelled from the other end of said tube by gas in the housing chamber enters said electrolytic cell.

5. The combination defined in claim 3 in which the housing is associated with the second body of liquid water such that said second body is fluid conductively connected to the housing chamber for conducting water through the fixed chamber opening from the body of water into said chamber and from said chamber to said body of water; and in which said housing, the body of electrolyte and the electrolytic cell are arranged with respect to each other and the capillary tube such that water expelled from the other end of said tube by gas in the housing chamber is added to the body of electrolyte and such that the amount of water added to the body of electrolyte is effective for causing a substantially equal amount of electrolyte from said body of electrolyte to enter said electrolytic cell.

6. The combination of
   a source of liquid electrolyte;
   an electrolytic cell for producing gas from said electrolyte;
   a housing defining a chamber having a fixed opening;
   an open-ended capillary tube connected to the housing such that a portion of the tube extends downwardly within the housing chamber and such that one open end of the tube is positioned above the fixed opening in said chamber;
   said housing being associated with the source of electrolyte such that said source is fluid-conductively connected to the housing chamber for conducting electrolyte through the fixed chamber opening from said source into said chamber and from said chamber to said source, and such that said housing is arranged with respect to said source so that electrolyte is caused to flow through the fixed chamber opening into said housing chamber and upwardly in the downwardly extending portion of the capillary tube so as to form a column of electrolyte in said tube having a preselected height; and
   a gas conducting conduit connecting the electrolytic cell and the housing so that gas produced in said cell is caused to enter the housing chamber for causing electrolyte in the chamber to flow outwardly thereof through the fixed chamber opening to said source until the level of the electrolyte in the chamber is such that the chamber electrolyte is separated from the open end of the capillary tube in said chamber and from the column of electrolyte in said tube so that said gas is applied to the column of electrolyte for causing the same to be expelled from the other open end of the capillary tube; said other open end of said capillary tube being fluid-conductively disposed with respect to the electrolytic cell such that electrolyte expelled from said other open end is caused to enter said cell.

7. The combination defined in claim 6 in which the capillary tube is of a character such that the electrolyte comprising the column of electrolyte remains in concave meniscus-forming contact with the inner surface of the tube until the column of electrolyte is expelled from the other open end of said capillary tube.

8. The combination of
   electrical means including an electrolytic cell for producing pressurized gas; and
   means for transferring a quantity of liquid from a source thereof to another place in response to pressurized gas produced in the electrolytic cell, said means comprising:
   a housing defining a fluid-receiving chamber for receiving liquid from the source, said housing having a fixed opening for conducting liquid from the source into the chamber and for returning liquid from the chamber back to said source;
   an open-ended capillary tube connected to the housing so that one end portion extends downwardly within the housing chamber such that liquid in said chamber can flow upwardly in said end portion through the open end thereof to form a column of liquid in said tube, said downwardly extending end portion being disposed in the chamber with respect to the fixed chamber opening such that the one open end of the tube is positioned above said fixed opening; and
   a gas conducting conduit connecting the electrolytic cell and the housing for conducting pressurized gas from said cell into the housing chamber such that pressurized gas of a predetermined pressure magnitude is effective for causing liquid in said chamber to flow outwardly thereof through the fixed chamber opening to the source of liquid until the level of the chamber liquid is such that said chamber liquid is separated from the one open end of the capillary tube and from the column of liquid in said tube so that said pressurized gas is applied to said column of liquid for causing the same to be expelled from the other open end of said capillary tube.

9. The combination defined in claim 8 in which the capillary tube is of a character such that the liquid comprising the column of liquid remains in concave meniscus-forming contact with the wall of the tube until the column of liquid is expelled from the other open end of the capillary tube.

10. A metering device for transferring liquid from one place to another in response to pressurized gas from a source thereof, said device comprising:
    a housing defining a fluid-receiving chamber for receiving liquid from a source of liquid, said housing having a fixed opening for conducting liquid from the source into the chamber and for returning liquid from the chamber back to said source;
    an open-ended capillary tube connected to the housing so that one end portion extends downwardly within the chamber housing such that liquid in said chamber can flow upwardly in said end portion through the open end thereof to form a column of liquid in said tube, said downwardly extending end portion being disposed in the chamber with respect to the fixed opening such that the one open end of the tube is positioned in a plane above said fixed opening; and
    a gas-conducting conduit connected to the housing for conducting pressurized gas from a gas-pressure source into the housing chamber such that pressurized gas of a predetermined pressure magnitude is effective for causing liquid in said chamber to flow outwardly through the fixed chamber opening back to the source of the liquid until the level of the chamber liquid is lowered to a plane such that said chamber liquid is separated from the one open end of the capillary tube in said chamber and from the column of liquid in said tube so that said gas can be applied to said column for causing the liquid of the column to be expelled from the other open end of said capillary tube.

References Cited in the file of this patent

UNITED STATES PATENTS

| | | |
|---|---|---|
| 1,241,889 | Schauweker | Oct. 2, 1917 |
| 1,394,785 | Murphy | Oct. 24, 1921 |
| 1,459,282 | Clark | June 19, 1923 |
| 1,749,312 | Blair | Mar. 4, 1930 |
| 1,969,960 | Blum | Aug. 14, 1934 |
| 2,825,685 | Schachter et al. | Mar. 4, 1958 |
| 2,902,418 | Burns | Sept. 1, 1959 |
| 2,957,491 | Lowery | Oct. 25, 1960 |
| 2,970,604 | Henry | Feb. 7, 1961 |